(12) United States Patent
Kesinger

(10) Patent No.: US 6,186,487 B1
(45) Date of Patent: Feb. 13, 2001

(54) SHOCK ABSORBING POST ASSEMBLY FOR CRUTCH AND BICYCLE SEAT APPLICATIONS

(76) Inventor: Donald A. Kesinger, P.O. Box 396, Morrison, CO (US) 80465

(*) Notice: Under 35 U.S.C. 154(b), the term of this patent shall be extended for 0 days.

(21) Appl. No.: 09/229,541

(22) Filed: Jan. 13, 1999

Related U.S. Application Data

(60) Provisional application No. 60/101,235, filed on Sep. 21, 1998.

(51) Int. Cl.[7] .................................................. B60G 11/14

(52) U.S. Cl. .......................... 267/249; 280/283; 297/209; 267/216

(58) Field of Search ..................................... 267/249, 250, 267/216, 213, 212, 202; 297/195.1, 208, 209; 280/275, 283; 135/65, 77, 82, 85, 75, 69

(56) References Cited

U.S. PATENT DOCUMENTS

| 2,297 | * | 10/1841 | Ball ........................................ 135/82 |
| 575,152 | | 1/1897 | Fogg . |
| 600,365 | | 3/1898 | Hindmarsh . |
| 601,978 | | 4/1898 | Nevill . |
| 636,726 | | 11/1899 | Hindmarsh . |
| 664,184 | | 12/1900 | Stoll ..................................... 280/283 |
| 686,156 | | 11/1901 | Snyder ................................ 280/283 |
| 973,283 | * | 10/1910 | Loftin .................................... 135/82 |
| 2,041,334 | * | 5/1936 | Hage ..................................... 135/82 |
| 2,414,758 | * | 1/1947 | Moss ..................................... 135/82 |
| 2,675,014 | * | 4/1954 | Powers .................................. 135/82 |

(List continued on next page.)

FOREIGN PATENT DOCUMENTS

| 885282 | 9/1943 | (FR) . |
| 928951 | 12/1947 | (FR) . |
| 14225 | 8/1899 | (GB) . |
| 22845 | 2/1901 | (GB) . |
| 421323 | 5/1947 | (IT) . |

OTHER PUBLICATIONS

Donald A. Kesinger, "Bicycle Seat Suspension System", Ser. No. 08/699,920, filed Aug. 20, 1996.

*Primary Examiner*—Robert J. Oberleitner
*Assistant Examiner*—Devon Kramer
(74) *Attorney, Agent, or Firm*—Flanagan & Flanagan; John R. Flanagan; John K. Flanagan

(57) ABSTRACT

A shock absorbing post assembly includes an outer tube, inner shaft, guide elements, and spring member. The outer tube has an exterior surface with circumferential portions along an outer cylinder encompassing the outer tube and outer races formed longitudinally between opposite ends of and spaced apart circumferentially about the outer tube. The outer races are within the outer cylinder between and inwardly of the circumferential portions of exterior surface. The inner shaft is received in and partially extends above the outer tube and has an exterior surface with circumferential portions along an inner cylinder encompassing the inner shaft and inner races formed longitudinally between opposite ends of and spaced apart circumferentially about the inner shaft in alignment with outer races of the outer tube so as to provide pairs of aligned outer and inner races. The inner races are within the inner cylinder between and inwardly of the circumferential portions of the exterior surface of the inner shaft. Guide elements are between and extend within pairs of aligned outer and inner races so as to permit reciprocatory sliding movement of the inner shaft relative to the outer tube and thereby allow the inner shaft to extend from and retract into the outer tube between extended and depressed positions. The spring member is disposed in the outer tube below the inner shaft so as to yieldably support the inner shaft at the extended position relative to the other tube while permitting the inner shaft to retract into the outer tube toward the depressed position in response to the post assembly receiving a shock impact thereon.

19 Claims, 2 Drawing Sheets

U.S. PATENT DOCUMENTS

| | | | |
|---|---|---|---|
| 3,989,263 | | 11/1976 | Stuck et al. .......................... 280/283 |
| 4,958,651 | * | 9/1990 | Najm ...................................... 135/82 |
| 5,044,648 | | 9/1991 | Knapp ................................. 280/283 |
| 5,094,424 | * | 3/1992 | Hartway .............................. 248/600 |
| 5,613,580 | * | 3/1997 | Young .................................. 188/300 |
| 5,720,474 | * | 2/1998 | Sugiyama ............................ 267/249 |
| 5,927,738 | * | 7/1999 | Kesinger ............................. 280/220 |

* cited by examiner

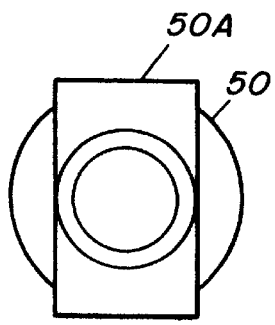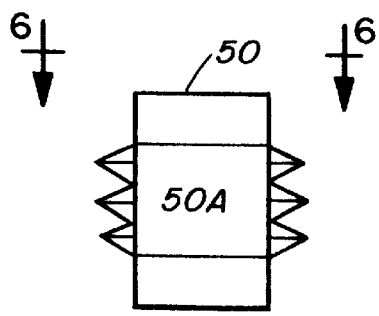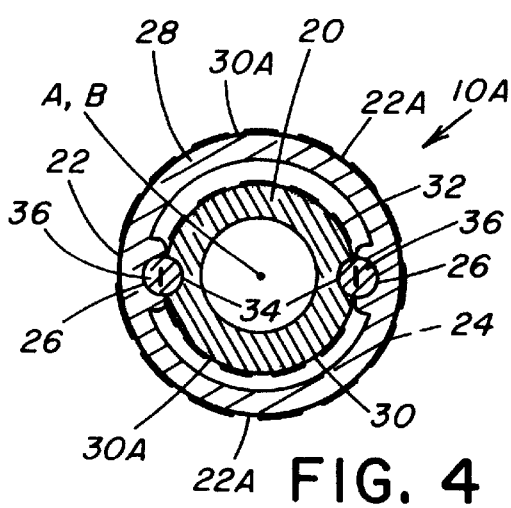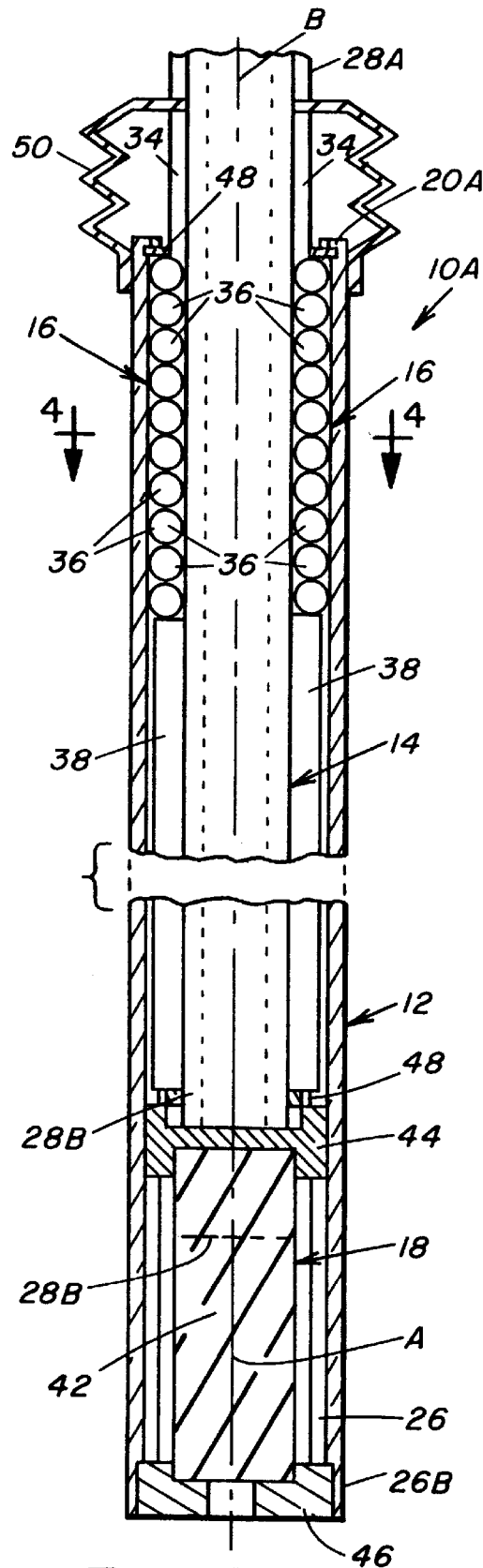

SHOCK ABSORBING POST ASSEMBLY FOR CRUTCH AND BICYCLE SEAT APPLICATIONS

This application claims the benefit of U.S. provisional application No. 60/101,235, filed Sep. 21, 1998.

BACKGROUND OF THE INVENTION

1. Field of the Invention

The present invention generally relates to bicycle shock absorbing devices and, more particularly, is concerned with a shock absorbing post assembly for both crutch and bicycle seat applications.

2. Description of the Prior Art

Various designs of shock absorbing devices have been proposed over the years for the purpose of reducing transmission of shock impacts and vibrations to a cyclist and thereby increasing riding comfort and performance in all modes of cycling. Existing bicycle seat posts offer a convenient and accessible location on a bicycle for installation of such devices. The rising popularity of mountain biking, involving riding over rough terrain which causes jolts to the spine of the cyclist, has heightened interest in continued development and refinement of shock absorbing bicycle seat post devices.

One design approach of prior art shock absorbing bicycle seat post devices has been to provide an outer tube, an inner tube telescopingly received in the outer tube and extending from an upper end thereof, a race or races formed in one or both of the outer and inner tubes along portions of the lengths thereof, ball bearings disposed in the races or races, and a compressible body disposed within the outer tube between lower ends of the outer and inner tubes. Representative examples of such prior art devices are disclosed in U.S. Pat. No. 575,152 to Fogg, U.S. Pat. Nos. 600,365 and 636,726 to Hindmarsh, U.S. Pat. No. 601,978 to Nevill, U.S. Pat. No. 664,184 to Stoll, U.S. Pat. No. 686,156 to Snyder, U.S. Pat. No. 5,044,648 to Knapp, Italian Pat. No. 421,323 to Ponzecchi, and French Pat. No. 885,282 to Vaglio. While most of these prior art seat post devices may function satisfactorily under the specific conditions for which they were designed, many of these prior art devices introduce drawbacks in that they are complicated and costly to manufacture and difficult to assemble and unduly increase the overall weight of the bicycle seat post.

Consequently, a need still exists for a shock absorbing post assembly which will overcome these drawbacks without introducing any new drawbacks in their place.

SUMMARY OF THE INVENTION

The present invention provides a shock absorbing post assembly designed to satisfy the aforementioned need. The shock absorbing post assembly of the present invention is adapted for a crutch application as well as a bicycle seat application. The shock absorbing post assembly is of simple construction, low cost to manufacture, easy to assemble and only minimally increases the overall weight of the crutch or bicycle seat.

Accordingly, the present invention is directed to a shock absorbing post assembly for use in conjunction with a crutch, a bicycle seat and other comparable applications. The shock absorbing post assembly basically comprises an elongated outer tube, an elongated inner shaft, a plurality of guide elements, and a spring means.

The outer tube includes an exterior surface with circumferential portions lying along an outer cylinder encompassing the outer tube and a plurality of outer races formed longitudinally along and spaced apart circumferentially from one another about the outer tube. The outer races are disposed within the outer cylinder between and inwardly of the circumferential portions of the exterior surface of the outer tube. The inner shaft is at least partially received in the outer tube such that the inner shaft extends beyond the outer tube. The inner shaft includes an exterior surface with circumferential portions lying along an inner cylinder encompassing the inner shaft and a plurality of inner races formed longitudinally along and spaced apart circumferentially from one another about the inner tube and respectively in alignment with the outer races of the outer tube so as to provide a plurality of pairs of aligned outer and inner races. The inner races are disposed within the inner cylinder between and inwardly of the circumferential portions of the exterior surface of the inner shaft.

The guide elements are disposed between and extend within the pairs of aligned outer and inner races so as to permit the inner shaft to undergo reciprocatory sliding movement relative to the outer tube and thereby extend from and retract into the outer tube between corresponding extended and depressed positions relative to the outer tube. In a first exemplary form, the guide elements includes a plurality of ball bearings. In a second exemplary form, the guide elements includes a plurality of elongated rods preferably made of low-friction plastic material with the ball bearings.

The spring means is disposed in the outer tube for yieldably supporting the inner shaft at the extended position relative to the outer tube while permitting the inner shaft to retract into the outer tube toward the depressed position in response to the post assembly shaft receiving a shock impact thereon. In an exemplary form, the spring means includes a body of elastomer material.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 3 is a side elevational view partly in section of a second embodiment of the shock absorbing post assembly of the present invention.

FIG. 4 is an enlarged cross-sectional view of the post assembly taken along line 4—4 of FIG. 3.

FIG. 5 is a side elevational view of a boot of the post assembly of FIG. 3.

FIG. 6 is an end elevational view of the boot as seen along line 6—6 of FIG. 5.

DETAILED DESCRIPTION OF THE INVENTION

Figures 1, 2:
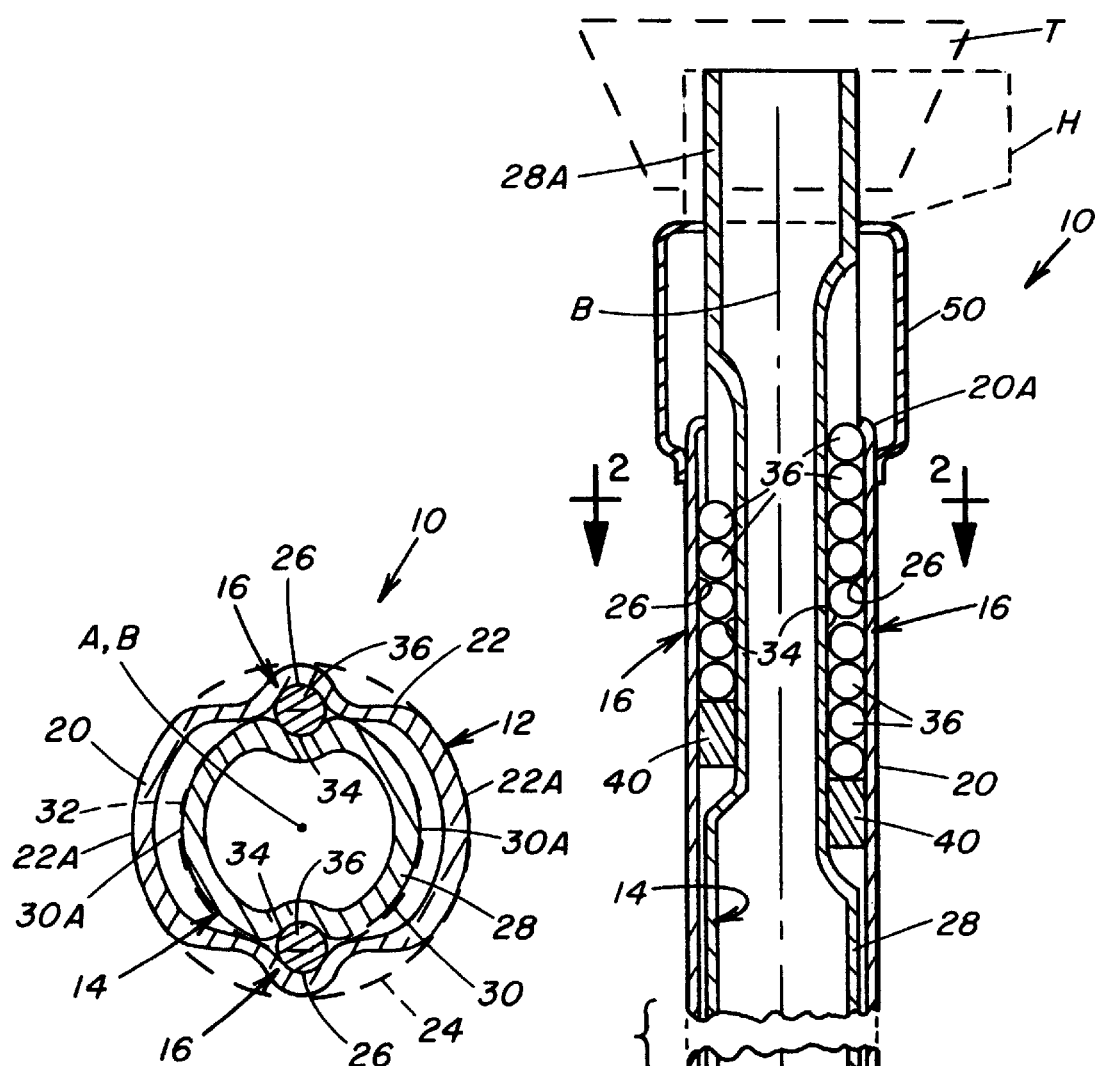
FIG. 1 is a side elevational view partly in section of a first embodiment of a shock absorbing post assembly of the present invention.
FIG. 2 is an enlarged cross-sectional view of the post assembly taken along line 2—2 of FIG. 1.

Referring to FIGS. 1 and 3 of the drawings, there is respectively illustrated first and second embodiments of a shock absorbing post assembly, generally designated 10 and 10A, of the present invention for use in conjunction with a crutch, a bicycle seat and other comparable applications. Each embodiment of the shock absorbing post assembly 10, 10A basically includes an outer tube 12, an inner shaft 14, a plurality of guide elements 16, and a spring member 18.

The outer tube 12 of each embodiment of the post assembly 10, 10A is preferably elongated, hollow and rigid in its structural makeup, made of a suitable material such as aluminum, and has a tubular sidewall 20 which is cylindrical in shape. The tubular sidewall 20 of the outer tube 12 defines a longitudinal axis A and ha s opposite first and second ends 20A, 20B, and an exterior surface 22 extending between the opposite first and second ends 20A, 20B. Circumferential portions 22A of the exterior surface 22 lie along an outer cylinder 24 encompassing and defined by the outer tube 12 so as to extend concentrically about the longitudinal axis A of the outer tub e 12. The first end 20A of the tubular sidewall 20 of the outer tube 12 can have fitted thereon a rubber tip T of a crutch or a clamp head H of a bicycle seat, both as seen in dashed line form in FIGS. 1 and 3.

The tubular sidewall 20 of the outer tube 12 has a plurality of outer tracks or races 26 of arcuate cross-sectional shape formed longitudinally between its opposite first and second ends 20A, 20B and circumferentially spaced apart from one another about the outer tube 12. In the first exemplary embodiment of FIGS. 1 and 2, the outer races 26 are formed on the tubular sidewall 20 of the outer tube 12 by conventional die forming techniques. In the second exemplary embodiment of FIGS. 3 and 4, the outer races 26 are formed on the tubular sidewall 20 of the outer tube 12 when the tube itself is being formed by conventional tube extruding and drawing techniques. In both embodiments the outer races 26 extend parallel to one another completely between the first and second ends 20A, 20B of the outer tube 12 and are disposed within the true outer cylinder 24 of the outer tube 12 between and inwardly of the circumferential portions 22A of the exterior surface 22 of the tubular sidewall 20 of the outer tube 12.

The inner shaft 14 of each embodiment of the post assembly 10, 10A is telescopically received in the hollow outer tube 12 and has a longitudinal axis B substantially coincident with the longitudinal axis A of the outer tube 12. The inner shaft 14 is preferably elongated, hollow and rigid in its structural makeup, made of a suitable material such as aluminum, and has a tubular sidewall 28 which is cylindrical in shape. The tubular sidewall. 28 of the inner shaft 14 has opposite first and second ends 28A, 28B and an exterior surface 30 extending between the opposite first and second ends 28A, 28B. Circumferential portions 30A of the exterior surface 30 lie along an inner cylinder 32 encompassing and defined by the inner shaft 14 so as to extend concentrically about the longitudinal axis B of the inner shaft 14. The first end 28A of the tubular sidewall 28 of the inner shaft 14 extends beyond the first end 20A of the tubular sidewall 20 of the outer tube 12 and the second end 28B of the tubular sidewall 28 of the inner shaft 14 is disposed between the opposite first and second ends 20A, 20B of the tubular sidewall of the outer tube 12.

The tubular sidewall 28 of the inner shaft 14 has a plurality of inner tracks or races 34 of arcuate cross-sectional shape formed longitudinally between its opposite first and second ends 28A, 28B and circumferentially spaced apart from one another about the inner shaft 14. In the first exemplary embodiment of FIGS. 1 and 2, the inner races 34 are formed on the tubular sidewall 28 of the inner tube 14 by conventional die forming techniques so as to extend only for a portion of the length of the inner shaft 14. In the second exemplary embodiment of FIGS. 3 and 4, the inner races 34 are formed on the tubular sidewall 28 of the inner tube 14 when the tube itself is being formed by conventional tube extruding and drawing techniques so as to extend the entire length of the inner shaft 14. In both embodiments the inner races 34 extend parallel to one another and are disposed within the true inner cylinder 32 of the inner shaft 14 between and inwardly of the circumferential portions 30A of the exterior surface 30 of the inner shaft 14. The inner races 34 are respectively aligned with the outer races 26 of the outer tube 12 so as to provide pairs of aligned outer and inner races 26, 34.

The guide elements 16 of each embodiment of the post assembly 10, 10A are disposed between and extend within respective pairs of aligned outer and inner races 26, 34 of the outer tube 12 and inner shaft 14 so as to permit the inner shaft 14 to undergo telescoping reciprocatory sliding movement relative to the outer tube 14 along their coincident longitudinal axes A, B and thereby extend from and retract into the first end 20A of the tubular sidewall 20 of the outer tube 12 between corresponding extended and depressed positions relative to the outer tube 12, as seen in solid and dashed line positions in FIGS. 1 and 3. More particularly, in the first exemplary form shown in FIG. 1, the guide elements 16 preferably include ball bearings 36. In a second exemplary form shown in FIG. 3, the guide elements 16 preferably include the plurality of ball bearings 32 and a plurality of elongated rods 38, preferably made of low-friction plastic material, in conjunction with the ball bearings 36. Alternatively, the elongated rods 38 may be employed without the ball bearings 36.

Also, in the first exemplary embodiment of FIG. 1, the inner races 34 can differ in length so as to prevent accumulation of stress concentrations at the ends thereof. There are different numbers of ball bearings 36 disposed in the aligned pairs of outer and inner races 26, 34 in the first embodiment. In addition, there are plugs 40 inserted at one ends of the aligned pairs of outer and inner races 26, 34 to prevent jamming of the ball bearings 36 at the one ends. The aligned pairs of outer and inner races 26, 34 are closed off at the other ends by the first end 20A of the sidewall 20 of the outer tube 12 being crimped inwardly which prevents the entire post assembly 10 from coming apart. The aligned pairs of parallel outer and inner races 26, 34 and the guide elements 16 therein also prevent rotation of the outer tube 12 and inner shaft 14 relative to one another.

The spring member 18 of each embodiment of the post assembly 10, 10A is disposed in the outer tube 12 between the second end 28B of the inner shaft 14 and the second end 20B of the outer tube 12. The spring member 18 is compressible so as to yieldably support the inner shaft 14 at the extended (solid line) position of FIGS. 1 and 3 relative to the outer tube 12 while permitting the inner shaft 14 to retract into the outer tube 14 toward the depressed (dashed line) position of FIGS. 1 and 3 in response to the post assembly 10, 10A receiving a shock impact thereon. In the one exemplary form illustrated in FIGS. 1 and 3, the yieldable spring member 18 preferably includes a body 42 of elastomer material, such as rubber or the like. The elastomer body 42 can be provided as a single element or a plurality of elements. The spring member 18 can take any other suitable forms, such as a coil spring or conical spring washers.

Furthermore, in addition each embodiment of the post assembly 10, 10A can further include an annular slider bushing 44 on the second end 28B of the inner shaft 14 to assist in guiding movement of the inner shaft 14 relative to the outer tube 12. Also, each embodiment of the post assembly 10, 10A may have a circular plug 46 threaded into the second end 20B of the outer tube 12 adjacent to the elastomer body 42 to support and upon threaded adjustment to change the preloading generated by the yieldable elastomer body 44 in the outer tube 12. The second embodiment has snap rings 48 fitted into annular grooves in the interior of the outer tube 12 to hold the post assembly 10A together. Each embodiment of the post assembly 10, 10A still further includes an annular boot 50 surrounding the portion of the inner shaft 14 which extends beyond the outer tube 12. The boot 50 is employed to keep out dirt and grim and prevent dispersal of any internal lubricant. In the second embodiment, the boot 50 has a bellows-type configuration with a pair of opposing flat areas 50A thereon to provide for logos and the like.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A shock absorbing post assembly for crutch and bicycle seat applications, comprising:

(a) an elongated outer tube including an exterior surface with circumferential portions lying along an outer cylinder encompassing said outer tube and a plurality of outer races formed longitudinally along and circumferentially spaced apart from one another about said outer tube and disposed within said outer cylinder between and inwardly of said circumferential portions of said exterior surface of said outer tube;

(b) an elongated inner shaft partially received in said outer tube such that said inner shaft extends beyond said outer tube, said inner shaft including an exterior surface with circumferential portions lying along an inner cylinder encompassing said inner shaft and a plurality of inner races formed longitudinally along and circumferentially spaced apart from one another about said inner tube and respectively in alignment with said outer races of said outer tube so as to provide a plurality of pairs of aligned outer and inner races, said inner races being disposed within said inner cylinder between and inwardly of said circumferential portions of said exterior surface of said inner shaft;

(c) a plurality of guide elements disposed between and extending within said pairs of aligned outer and inner races so as to permit said inner shaft to undergo reciprocatory sliding movement relative to said outer tube and thereby extend from and retract into said outer tube between corresponding extended and depressed positions relative to said outer tube, wherein said guide elements include a plurality of elongated rods; and (d) means disposed in said outer tube for yieldably supporting said inner shaft at said extended position relative to said outer tube while permitting said inner shaft to retract into said outer tube toward said depressed position in response to said post assembly receiving a shock impact thereon.

2. The post assembly of claim 1 wherein said outer tube further includes a longitudinal axis, said outer cylinder extending concentrically about said longitudinal axis of said outer tube.

3. The post assembly of claim 1 wherein said outer tube further includes opposite first and second ends, said outer surface races extending between and to said opposite first and second ends.

4. The post assembly of claim 1 further comprising:

a slider bushing supporting an end of said inner shaft for movement relative to said outer tube.

5. The post assembly of claim 1 wherein said inner shaft includes a longitudinal axis lying substantially coincident with said longitudinal axis of said outer tube.

6. The post assembly of claim 5 wherein said inner cylinder extends concentrically about said longitudinal axis of said inner tube.

7. The post assembly of claim 1 wherein:

said outer tube further includes opposite first and second ends; and said inner shaft further includes opposite first and second ends, said first end of said inner shaft being disposed beyond said first end of said outer tube, said second end of said inner shaft being disposed between said opposite first and second ends of said outer tube.

8. The post assembly of claim 1 wherein said inner shaft further includes opposite first and second ends, said inner races differing in respective lengths and extending only a portion of the distance between said opposite first and second ends.

9. The post assembly of claim 1 wherein said inner shaft further includes opposite first and second ends, said inner races extending longitudinally between and to said opposite first and second ends of said inner tube.

10. The post assembly of claim 1 wherein said guide elements include a plurality of ball bearings.

11. The post assembly of claim 1 wherein said yieldably supporting means includes a body of elastomer material.

12. The post assembly of claim 1 further comprising:

a boot surrounding a portion of said inner shaft extending beyond said outer tube.

13. The post assembly of claim 1 further comprising:

a boot surrounding a portion of said inner shaft extending beyond said outer tube.

14. A shock absorbing post assembly for crutch and bicycle seat applications, comprising:

(a) an elongated outer tube including an exterior surface with circumferential portions lying along an outer cylinder encompassing said outer tube and a plurality of outer races formed longitudinally along and circumferentially spaced apart from one another about said outer tube and disposed within said outer cylinder between and inwardly of said circumferential portions of said exterior surface of said outer tube;

(b) an elongated inner shaft partially received in said outer tube such that said inner shaft extends beyond said outer tube, said inner shaft including an exterior surface with circumferential portions lying along an inner cylinder encompassing said inner shaft and a plurality of inner races formed longitudinally along and circumferentially spaced apart from one another about said inner tube and respectively in alignment with said outer races of said outer tube so as to provide a plurality of pairs of aligned outer and inner races, said inner races being disposed within said inner cylinder between and inwardly of said circumferential portions of said exterior surface of said inner shaft;

(c) a plurality of guide elements disposed between and extending within said pairs of aligned outer and inner races so as to permit said inner shaft to undergo reciprocatory sliding movement relative to said outer tube and thereby extend from and retract into said outer tube between corresponding extended and depressed positions relative to said outer tube;

(d) means disposed in said outer tube for yieldably supporting said inner shaft at said extended position relative to said outer tube while permitting said inner shaft to retract into said outer tube toward said depressed position in response to said post assembly receiving a shock impact thereon; and (e) a plug adjustably threaded in an end of said outer tube adjacent to and supporting said yieldably supporting means.

15. A shock absorbing post assembly for crutch and bicycle seat applications, comprising:

(a) an elongated outer tube including
  (i) a longitudinal axis,
  (ii) opposite first and second ends,
  (iii) an exterior surface extending between said opposite first and second ends and having circumferential portions lying along an outer cylinder encompassing said outer tube so as to extend concentrically about said longitudinal axis of said outer tube, and
  (iv) a plurality of outer races each formed longitudinally between said opposite first and second ends and spaced apart circumferentially from one another about said outer tube, said outer races being disposed within said outer cylinder between and inwardly of said circumferential portions of said exterior surface of said outer tube;

(b) an elongated inner shaft partially received in said outer tube and including
  (i) a longitudinal axis lying substantially coincident with said longitudinal axis of said outer tube,
  (ii) opposite first and second ends, said first end of said inner shaft being disposed beyond said first end of said outer tube and said second end of said inner shaft between disposed between said opposite first and second ends of said outer tube,
  (iii) an exterior surface extending between said opposite first and second ends and having circumferential portions lying along an inner cylinder encompassing said inner shaft so as to extend concentrically about said longitudinal axis of said inner shaft, and
  (iv) a plurality of inner races each formed longitudinally between said opposite first and second ends and spaced apart circumferentially from one another about said inner shaft in alignment with a respective outer race of said outer tube so as to provide aligned pairs of said outer and inner races, said inner races also being disposed within said inner cylinder between and inwardly of said circumferential portions of said exterior surface of said inner shaft;

(c) a plurality of guide elements each disposed between and extending within one of said aligned pairs of said outer and inner races of said outer tube and inner shaft so as to permit said inner shaft to undergo reciprocatory sliding movement relative to said outer tube along said coincident longitudinal axis thereof and thereby extend from and retract into said first end of said outer tube correspondingly between extended and depressed positions relative to said outer tube, wherein said guide elements include a plurality of elongated rods made of plastic material; and (d) spring means disposed in said outer tube between said second end of said inner shaft and said second end of said outer tube for yieldably supporting said inner shaft at said extended position relative to said outer tube while permitting said inner shaft to retract into said outer tube toward said depressed position in response to said post assembly receiving a shock impact thereon.

16. The post assembly of claim 15 wherein said guide elements include a plurality of ball bearings.

17. The post assembly of claim 15 wherein said yieldably supporting means includes a body of elastomer material.

18. A shock absorbing post assembly for crutch and bicycle seat applications, comprising:

(a) an elongated outer tube including
  (i) a longitudinal axis,
  (ii) opposite first and second ends,
  (iii) an exterior surface extending between said opposite first and second ends and having circumferential portions lying along an outer cylinder encompassing said outer tube so as to extend concentrically about said longitudinal axis of said outer tube, and
  (iv) a plurality of outer races each formed longitudinally between said opposite first and second ends and spaced apart circumferentially from one another about said outer tube, said outer races being disposed within said outer cylinder between and inwardly of said circumferential portions of said exterior surface of said outer tube;

(b) an elongated inner shaft partially received in said outer tube and including
  (i) a longitudinal axis lying substantially coincident with said longitudinal axis of said outer tube,
  (ii) opposite first and second ends, said first end of said inner shaft being disposed beyond said first end of said outer tube and said second end of said inner shaft between disposed between said opposite first and second ends of said outer tube,
  (iii) an exterior surface extending between said opposite first and second ends and having circumferential portions lying along an inner cylinder encompassing said inner shaft so as to extend concentrically about said longitudinal axis of said inner shaft, and
  (iv) a plurality of inner races each formed longitudinally between said opposite first and second ends and spaced apart circumferentially from one another about said inner shaft in alignment with a respective outer race of said outer tube so as to provide aligned pairs of said outer and inner races, said inner races also being disposed within said inner cylinder between and inwardly of said circumferential portions of said exterior surface of said inner shaft;

(c) a plurality of guide elements each disposed between and extending within one of said aligned pairs of said outer and inner races of said outer tube and inner shaft so as to permit said inner shaft to undergo reciprocatory sliding movement relative to said outer tube along said coincident longitudinal axes thereof and thereby extend from and retract into said first end of said outer tube correspondingly between extended and depressed positions relative to said outer tube;

(d) spring means disposed in said outer tube between said second end of said inner shaft and said second end of said outer tube for yieldably supporting said inner shaft at said extended position relative to said outer tube while permitting said inner shaft to retract into said outer tube toward said depressed position in response to said post assembly receiving a shock impact thereon; and (e) a plug adjustably threaded in said second end of said outer tube adjacent to and supporting said yieldably supporting means.

19. A shock absorbing post assembly for crutch and bicycle seat applications, comprising:
  (a) an elongated outer tube including
    (i) a plurality of exterior surface portions on said outer tube circumferentially spaced apart from one another about said tube and lying along and defining an outer cylinder encompassing said outer tube, and
    (ii) a plurality of outer races formed on said outer tube and extending longitudinally along and circumferentially spaced apart from one another about said outer tube and being disposed within said outer cylinder between and extending inwardly of said circumferentially spaced exterior surface portions of said outer tube;
  (b) an elongated inner shaft partially received in said outer tube such that said inner shaft extends beyond said outer tube, said inner shaft including an exterior surface with circumferential portions lying along an inner cylinder encompassing said inner shaft and a plurality of inner races formed longitudinally along and circumferentially spaced apart from one another about said inner tube and respectively in alignment with said outer races of said outer tube so as to provide a plurality of pairs of aligned outer and inner races, said inner races being disposed within said inner cylinder between and inwardly of said circumferential portions of said exterior surface of said inner shaft;
  (c) a plurality of guide elements disposed between and extending within said pairs of aligned outer and inner races so as to permit said inner shaft to undergo reciprocatory sliding movement relative to said outer tube and thereby extend from and retract into said outer tube between corresponding extended and depressed positions relative to said outer tube; and
  (d) means disposed in said outer tube for yieldably supporting said inner shaft at said extended position relative to said outer tube while permitting said inner shaft to retract into said outer tube toward said depressed position in response to said post assembly receiving a shock impact thereon.

* * * * *